(12) United States Patent
Sostmann et al.

(10) Patent No.: US 8,110,055 B2
(45) Date of Patent: Feb. 7, 2012

(54) SELF-SEALING PNEUMATIC VEHICLE TIRE AND METHOD FOR PRODUCING A SELF-SEALING PNEUMATIC VEHICLE TIRE

(75) Inventors: Stefan Sostmann, Langenhagen (DE); Martin Welzhofer, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 409 days.

(21) Appl. No.: 12/379,270

(22) Filed: Feb. 18, 2009

(65) Prior Publication Data

US 2009/0205765 A1   Aug. 20, 2009

Related U.S. Application Data

(63) Continuation of application No. PCT/EP2007/055953, filed on Jun. 15, 2007.

(30) Foreign Application Priority Data

Aug. 18, 2006   (DE) .......................... 10 2006 038 806

(51) Int. Cl.
*B60C 19/00* (2006.01)
(52) U.S. Cl. ..................................... 156/115; 156/110.1

(58) Field of Classification Search .................. 156/115, 156/110.1; 152/502, 503, 504
See application file for complete search history.

(56) References Cited

U.S. PATENT DOCUMENTS

| | | | |
|---|---|---|---|
| 3,903,947 A | 9/1975 | Emerson | |
| 3,981,342 A | 9/1976 | Farber et al. | |
| 4,113,799 A | 9/1978 | Van Ornum et al. | |
| 4,359,078 A * | 11/1982 | Egan | 156/115 |
| 4,359,354 A | 11/1982 | Böhm | |
| 4,743,497 A * | 5/1988 | Thorsrud | 156/115 |
| 5,295,525 A | 3/1994 | Sanda, Jr. | |
| 6,508,898 B1 | 1/2003 | Rustad et al. | |
| 6,935,391 B2 | 8/2005 | Naito et al. | |
| 2004/0194862 A1 | 10/2004 | Fukutomi et al. | |
| 2006/0174991 A1 | 8/2006 | Naito et al. | |
| 2008/0078489 A1 | 4/2008 | Fukutomi et al. | |

* cited by examiner

*Primary Examiner* — Katarzyna Wyrozebsky
*Assistant Examiner* — John Blades
(74) *Attorney, Agent, or Firm* — Walter Ottesen

(57) ABSTRACT

A self-sealing pneumatic tire has a sealing band (3) applied adheringly in the circumferential direction on the inner side of the tire and radially within the tread. A sealant (2) is applied to a carrier material (1). The carrier material (1) of the sealing band (3) is a foil on which the sealant (2) has been applied. The sealant, because of its intrinsic stickiness, adheres both to the carrier material (1) and to the inner side of the tire.

3 Claims, 2 Drawing Sheets

SELF-SEALING PNEUMATIC VEHICLE TIRE AND METHOD FOR PRODUCING A SELF-SEALING PNEUMATIC VEHICLE TIRE

CROSS REFERENCE TO RELATED APPLICATIONS

This application is a continuation application of international patent application PCT/EP 2007/055953, filed Jun. 15, 2007, designating the United States and claiming priority from German application 10 2006 038 806.2, filed Aug. 18, 2006, and the entire content of both applications is incorporated herein by reference.

FIELD OF THE INVENTION

The invention relates to a self-sealing pneumatic vehicle tire with a sealing band adheringly attached in the circumferential direction on the inner side of the tire, radially within the tread, with a sealant applied on a carrier material. The invention also relates to a method for producing a self-sealing tire using a sealing band with a sealant applied on a carrier material, which sealing band is introduced into the tire and applied on the inner wall surface of the tire, running between the shoulder regions.

BACKGROUND OF THE INVENTION

Such a tire and such a method are known from U.S. Pat. No. 6,935,391. The sealing band used there comprises a layer of foam material which is impregnated with an adhesive layer performing the sealing function. A bonding layer is applied to the adhesive layer. The bonding layer is likewise produced from an adhesive and the sealing band is attached to the inner wall surface of the tire by means of the bonding layer. In U.S. Pat. No. 3,981,342, further possibilities are described for producing or introducing a self-sealing layer in or on the inner wall of a pneumatic vehicle tire. For example, it is proposed to introduce the sealing layer between the carcass and the inner layer of the tire during the production of the tire with the inner layer consisting of a rubber mixture. Furthermore, it is proposed to produce the sealing layer from a solution that is applied by means of spraying. In a further variation, the hot sealant composition is to be applied as a strip directly on the inner circumferential surface of the tire by means of extrusion. Alternatively, a strip of the sealant composition can also be extruded in an appropriate width and thickness and subsequently be applied to the inner surface of the tire.

SUMMARY OF THE INVENTION

It is an object of the invention to provide a self-sealing tire and a method for producing the same using a sealing band. The sealing band is applied to the finished, already-vulcanized tire in a particularly simple way and is of a particularly simple structure which can be easily manipulated.

In a tire configured according to the invention, the carrier material of the sealing band is a foil on which a sealant is applied. This sealant adheres both to the carrier material and to the inner wall surface of the tire because of its intrinsic stickiness.

According to the method according to the invention, the sealant is extruded onto a carrier material in the form of a foil and the sealing band is obtained in this way by cutting to size as required. The sealing band is introduced into the already-vulcanized tire in a spirally rolled-up state and is then unwound along the inner wall surface of the tire.

In the invention, the sealant adheres both to the carrier material and to the inner side of the tire because of its intrinsic stickiness. As a result of the sealing band being spirally rolled up, as provided by the method according to the invention, the sealing band can be introduced into the interior of the tire and unwound there in a simple way. The entire production of the tire and handling of the sealing band can, in this case, proceed in an automated manner.

In the invention, many foil materials can be used for the carrier material, in particular foils that are based on thermoplastics, duroplastics or elastomers. Because of their intrinsic stickiness, sealants that are based on rubber or different types of rubber are suitable as the sealant.

In a preferred embodiment of the invention, the sealing band is positioned and fixed on a flexible receiving device and is introduced into the tire rolled-up spirally together with the device.

The spirally rolled-up sealing band, rolled-up together with the receiving device as may be required, can be introduced into the interior of the tire without difficulty if its outside diameter is less than the inside diameter of the bead cores of the tire. It may be expedient to use a spreading device for spreading the two bead cores apart or for increasing the distance therebetween.

The receiving device is rolled up with the sealing band without the turns contacting one another to avoid undesired adhesive attachment of the sealant.

In a further embodiment of the invention, the side of the carrier material that faces away from the sealant is provided with a coating which does not adhere to the sealant. The sealing band can, in this case, be rolled up without a receiving device and with the turns in contact.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
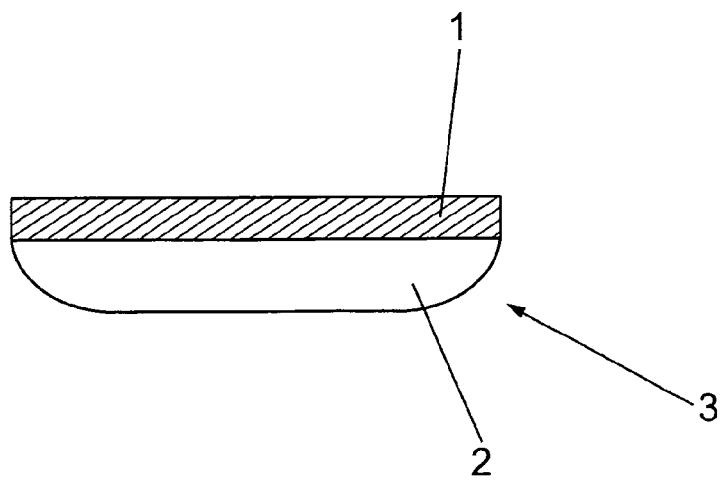
FIG. 1 shows a cross section through an embodiment of a sealing band according to the invention.
Figure 2:
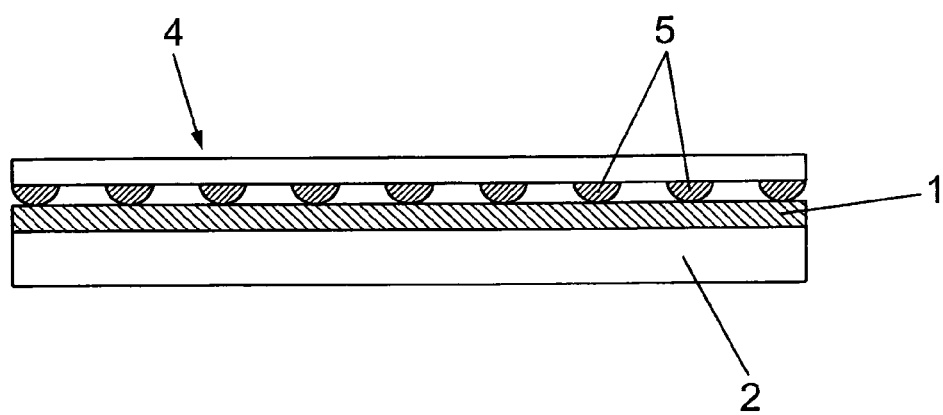
FIG. 2 shows the basic principle of a receiving device for the sealing band.

FIG. 1 shows a sealing band 3 according to the invention, comprising a foil as carrier material 1 and a sealant 2 applied to the carrier material by extrusion. For example, a partially crosslinked, butyl-rubber-based material, as described for instance in U.S. Pat. No. 4,113,799, can be used as the sealant 2. In principle, rubber-based sealants can be used, in particular those which are based on a combination of low molecular weight liquid types of rubber with high molecular weight solid types of rubber, as are known, for example, from U.S. Pat. No. 5,295,525. Polyurethane-based sealants, as are described in U.S. Pat. No. 6,508,898, can also be used.

Figure 3:
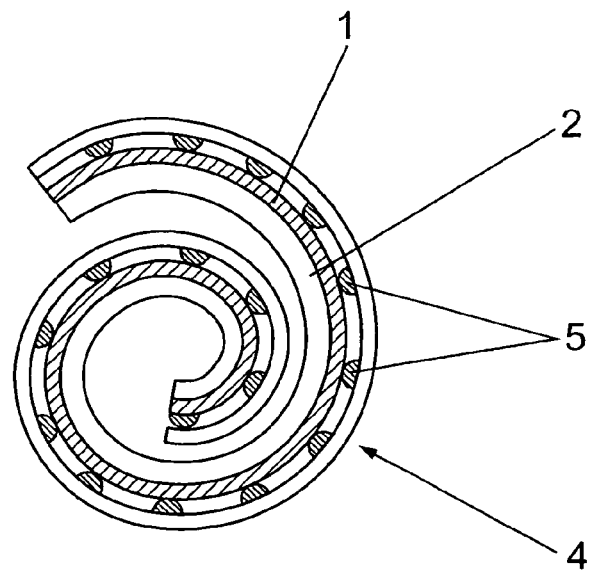
FIG. 3 shows the sealing band positioned on the receiving device of FIG. 2, ready for being introduced into the tire; and, FIG. 4 shows the introduction of the sealing band, positioned on the receiving device, into the tire.

Because of its intrinsic stickiness, the sealant 2 bonds with the carrier material 1, which can be a plastic foil, for example a polyethylene foil. The width of the produced sealing band 3 preferably corresponds to the width of the tire inner wall surface to be covered which extends from one tire shoulder to the other tire shoulder. The sealing band 3 is produced or cut to the required length and corresponds in length to the inner circumference to be covered. The sealing band is taken up by a flexible receiving device 4 and held on the same, for example, by suction devices 5. The receiving device 4 is rolled up spirally together with the positioned sealing band 3 by a suitable device, and without contact between the turns, as shown, for example, in FIG. 3. As an alternative thereto, the foil may be coated in such a way that it does not stick to the sealant, so that rolling-up with contact is possible.

Figure 4:
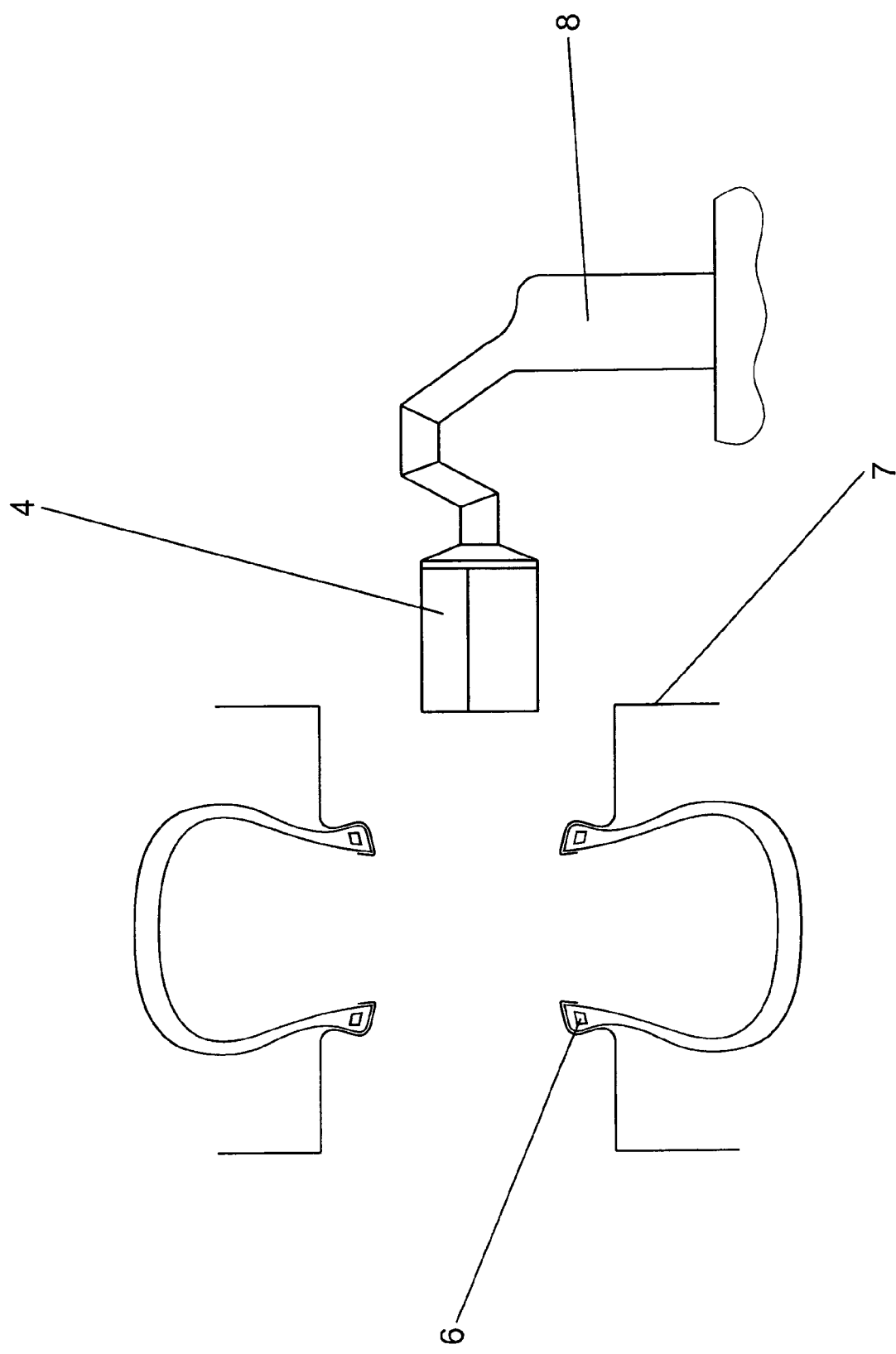

The sealing band 3, which is held by the receiving device 4 and spirally rolled-up in this way, is produced with an outer diameter that is less than the inner diameter of the cores 6 placed in the tire to be covered. The tire, which is shown schematically in FIG. 4, can have a conventional structure, so that its other component parts are not identified. By means of a spreading device 7, indicated in FIG. 4, the two cores 6 of the tire are spread apart to the extent that the rolled-up sealing band 3 can be introduced into the interior space of the tire by means of a positioning device 8 and can be spirally unwound on the inner surface radially within the tread. Because of the intrinsic stickiness of the sealant 2, the sealing band 3 remains adhering to the inner circumferential surface of the tire. In addition, the sealing band 3 may be pressed against the inner circumference by rollers or the like.

If the carrier material 1 is provided on its surface facing away from the sealant 2 with a coating, which does not adhere to the sealant 2, it is possible to dispense with a receiving device that is wound up with the carrier material during the spiral roll-up. The rolling-up device provided can be of a very simple design.

The carrier material 1, that is, the carrier material 1 covered with the sealant 2, can be produced to have a greater surface area from which the suitable sealing band 3 for each tire is produced by cutting to size. If a metallically coated foil is used for the carrier material 1, this coated foil can be held magnetically on a receiving device. Furthermore, the sealing band 3 can be made narrower than the width of the inner surface of the tire to be covered, so that the sealing band 3 is applied to the inner side of the tire in turns lying against one another. Introduction of the sealing band in circumferential segments is likewise possible.

As foil material for the carrier foil, the following foils can be used: foils based on thermoplastics, such as polypropylene, polyethylene terephthalate or polystyrene; foils based on acrylonitrile-butadiene-styrene copolymer, polyamide, polytetrafluoroethylene, polyvinyl chloride, ethylene vinyl acetate as well as polyblends of the materials mentioned; and, foils based on thermosetting resins and elastomers, such as natural rubber, styrene-butadiene rubber, butadiene rubber, butyl rubber, ethylene-propylene-diene rubber and the like.

It is understood that the foregoing description is that of the preferred embodiments of the invention and that various changes and modifications may be made thereto without departing from the spirit and scope of the invention as defined in the appended claims.

What is claimed is:

1. A method of making a self sealing tire comprising the steps of:
    providing an already vulcanized tire having two peripherally extending shoulder regions and an inner wall surface running between said shoulder regions;
    extruding sealant onto a carrier in the form of a foil to make a sealing band;
    positioning and fixing said sealing band on a flexible receiving device;
    rolling up said flexible receiving device together with said sealing band so as to form a composite spirally shaped unit;
    introducing said composite spirally shaped unit into said tire; and,
    unrolling said sealing band along said inner wall surface,
    wherein said flexible receiving device and said sealing band are rolled up without mutual contact of the turns of said composite spirally shaped unit.

2. The method of claim 1, wherein said sealing band is cut to size as required.

3. The method of claim 1, wherein said tire has two cores defining the inner diameter of said already vulcanized tire; and, said composite spirally shaped unit has an outer diameter smaller than said inner diameter.

\* \* \* \* \*